US010513339B2

(12) United States Patent
Nicks

(10) Patent No.: US 10,513,339 B2
(45) Date of Patent: Dec. 24, 2019

(54) AIRCRAFT CABIN CLIMATE CONTROL USING DATA FROM MOBILE ELECTRONIC DEVICES

(71) Applicant: The Boeing Company, Chicago, IL (US)

(72) Inventor: Eric Lee Nicks, Defiance, MO (US)

(73) Assignee: THE BOEING COMPANY, Chicago, IL (US)

( * ) Notice: Subject to any disclaimer, the term of this patent is extended or adjusted under 35 U.S.C. 154(b) by 43 days.

(21) Appl. No.: 15/691,204

(22) Filed: Aug. 30, 2017

(65) Prior Publication Data

US 2019/0061957 A1 Feb. 28, 2019

(51) Int. Cl.
*B64D 13/00* (2006.01)
*B64D 13/06* (2006.01)

(52) U.S. Cl.
CPC ...... *B64D 13/06* (2013.01); *B64D 2013/0655* (2013.01); *B64D 2013/0662* (2013.01)

(58) Field of Classification Search
None
See application file for complete search history.

(56) References Cited

U.S. PATENT DOCUMENTS

| 5,791,982 | A | * | 8/1998 | Curry | B64D 13/00 244/118.5 |
| 6,099,404 | A | * | 8/2000 | Hartenstein | B64D 13/00 126/113 |
| 7,112,770 | B2 | * | 9/2006 | Doh | B64D 13/00 219/679 |
| 9,321,535 | B2 | * | 4/2016 | Krakowski | B64D 13/00 |
| 9,749,664 | B1 | * | 8/2017 | Watson | H04N 21/23424 |
| 9,994,322 | B2 | * | 6/2018 | Bruno | B64D 13/08 |
| 2003/0106963 | A1 | * | 6/2003 | Smallhorn | B64D 11/0015 244/125 |
| 2007/0144726 | A1 | * | 6/2007 | Scherer | B64D 13/00 165/203 |
| 2007/0245751 | A1 | * | 10/2007 | Kulcke | B64D 13/06 62/91 |
| 2008/0053126 | A1 | * | 3/2008 | Ebigt | B60N 2/24 62/237 |
| 2008/0299887 | A1 | * | 12/2008 | Scherer | B64D 13/06 454/71 |
| 2011/0015495 | A1 | * | 1/2011 | Dothie | A47C 31/123 600/300 |
| 2011/0180618 | A1 | * | 7/2011 | Schumacher | B64D 13/00 236/44 A |
| 2013/0160472 | A1 | * | 6/2013 | Klimpel | B64D 13/08 62/87 |
| 2016/0285542 | A1 | * | 9/2016 | Du | B64D 11/0015 |

(Continued)

*Primary Examiner* — Jonathan M Dager
(74) *Attorney, Agent, or Firm* — Hanley, Flight & Zimmerman, LLC

(57) ABSTRACT

Methods, apparatus, systems, and articles of manufactures for aircraft cabin temperature control using temperature data from mobile electronic devices are described herein. An example mobile electronic device described herein includes a transceiver to receive a climate characteristic value measured by a personal mobile electronic device in a cabin of an aircraft and a cabin air manager to calculate an updated climate characteristic setting for an environmental control system (ECS) of the aircraft based on a current climate characteristic setting of the ECS and the climate characteristic value.

20 Claims, 7 Drawing Sheets

(56) References Cited

U.S. PATENT DOCUMENTS

| | | | |
|---|---|---|---|
| 2018/0065752 A1* | 3/2018 | Franco | B64D 13/02 |
| 2018/0148184 A1* | 5/2018 | Golle | B64D 13/04 |
| 2018/0181919 A1* | 6/2018 | Jobling | G06Q 10/025 |
| 2018/0186469 A1* | 7/2018 | Gregory | B64D 45/00 |
| 2018/0229860 A1* | 8/2018 | Clermont | B64F 1/34 |
| 2018/0273211 A1* | 9/2018 | Chang | B64F 5/40 |

* cited by examiner

AIRCRAFT CABIN CLIMATE CONTROL USING DATA FROM MOBILE ELECTRONIC DEVICES

FIELD OF THE DISCLOSURE

This disclosure relates generally to aircraft cabin climate control, and, more particularly, to aircraft cabin climate control using data from mobile electronic devices.

BACKGROUND

Aircraft typically have climate controlled cabins to regulate the temperature of the air in the cabin. Some aircraft utilize an environmental control system (ECS) to supply cooler or warmer air to the cabin to maintain the temperature at a desired temperature setting. Known aircraft typically include one or more temperature fixed located sensors that provide feedback to the ECS.

SUMMARY

An example mobile electronic device disclosed herein includes a transceiver to receive a climate characteristic value measured by a personal mobile electronic device in a cabin of an aircraft and a cabin air manager to calculate an updated climate characteristic setting for an environmental control system (ECS) of the aircraft based on a current climate characteristic setting of the ECS and the climate characteristic value.

A method to enhance air temperature control in a cabin of an aircraft disclosed herein includes accessing, by executing an instruction with a processor, a temperature reading from a personal mobile electronic device in the cabin of the aircraft and calculating, by executing an instruction with the processor, an updated temperature setting for an environmental control system (ECS) of the aircraft based on a current temperature setting of the ECS and the temperature reading.

A non-transitory machine readable storage medium disclosed herein includes instructions that, when executed, cause a machine to at least access a plurality of temperature readings from a plurality of personal mobile electronic devices in a cabin of an aircraft and calculate a change to a temperature setting for an environmental control system (ECS) of the aircraft based on a desired temperature in the cabin and the plurality of temperature readings.

DETAILED DESCRIPTION

Figure 1:
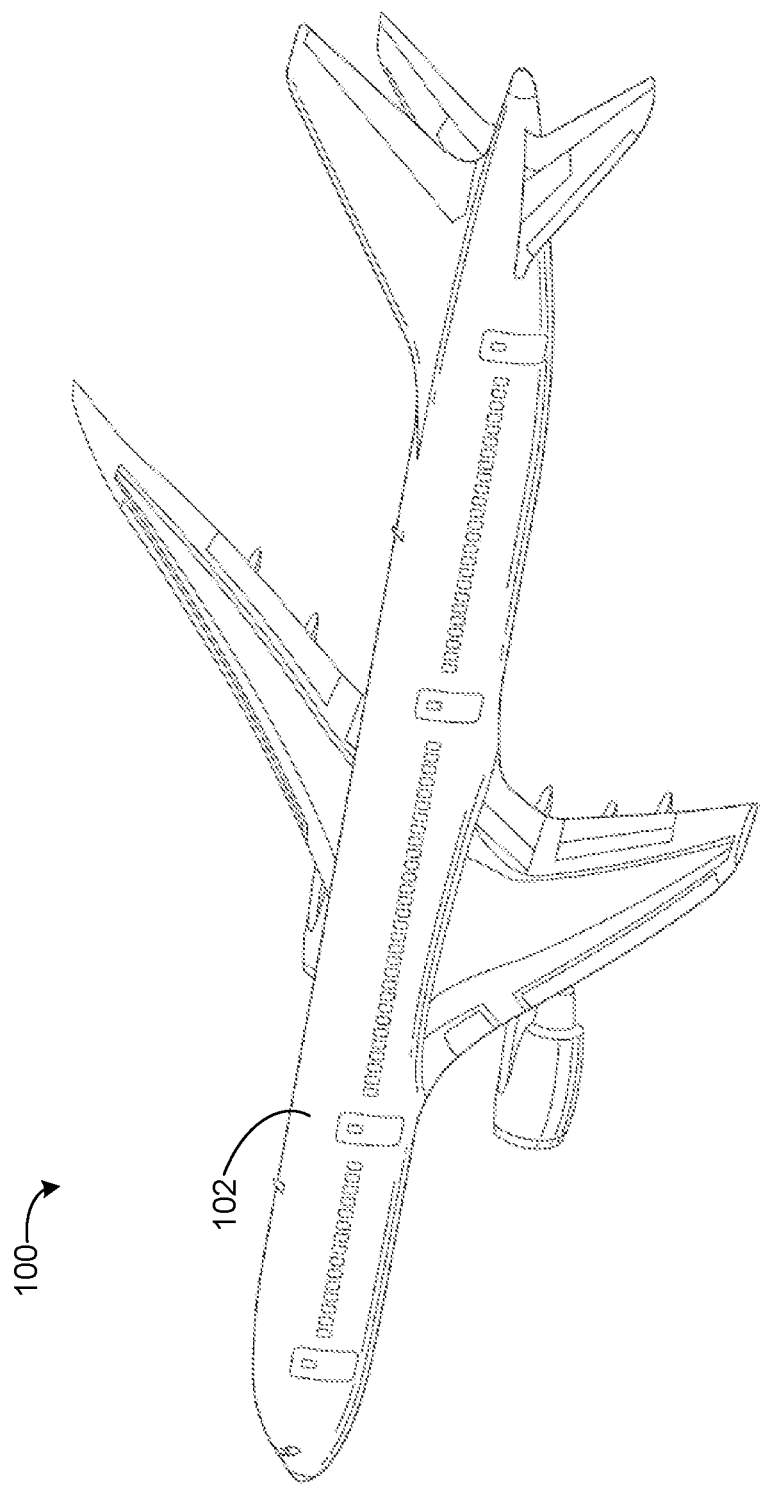
FIG. 1 illustrates an example aircraft in which the examples disclosed herein may be implemented.

Aircraft typically include a cabin in the fuselage of the aircraft where the passengers and/or flight crew travel during flight. The cabin is temperature controlled to provide a comfortable air temperature while flying. In known aircraft, an environmental control system (ECS) is used to provide warmer or cooler air to the cabin to maintain the temperature of the air in the cabin at a desired temperature. In some aircraft, the cabin is divided into multiple zones, where the temperature in each zone is separately controllable. In commercial aircraft, the temperature in the cabin (and/or the individual zones) is controlled by a temperature control panel (e.g., a thermostat) that is accessible by a flight attendant or other flight crew member. The flight attendant can view the current temperature setting and change (increase or decrease) the temperature in the cabin (and/or in each zone).

The ECS regulates the temperature of the air provided to the cabin (and/or the zones) based on feedback from one or more temperature sensors disposed in fixed, predetermined locations in the cabin. In known aircraft, only one or a limited number of temperature sensors are used in the cabin, and the temperature sensors are typically disposed along the same side of the cabin. In some instances, only one temperature sensor is provided in each zone. While the temperature sensors may sometimes provide sufficient feedback to the ECS, in other instances, the current temperature sensor readings may not accurately represent the true temperatures throughout the respective zones. In particular, the aircraft cabin may have pockets or sections of warmer or cooler air and, as a result, there may be significant temperature variances throughout a zone. Thus, while the temperature of the air in the immediate vicinity of the temperature sensor may be at or near the desired temperature, the temperature of the air on the other side of the cabin may be relatively warmer or cooler. For example, the temperature of the air proximate the temperature sensor may be at a desired temperature of 72° Fahrenheit (F) (22.2° Celsius (C)), while the temperature of the air throughout the rest of the cabin may be 76° F. (24.4° C.). When this happens, the passengers and/or flight crew member sitting at a distance from the temperature sensor often become uncomfortable, which can lead to dissatisfaction (e.g., complaints) and even lost revenue for the airline (because passengers may decide not to fly on the same airline again).

Disclosed herein are example methods, apparatus, systems, and articles of manufacture that use one or more climate characteristic values measured by one or more personal mobile electronic devices owned and/or controlled by occupants (including passengers and/or flight crew members) in a cabin of an aircraft to monitor the climate characteristic in the cabin (and/or in one or more zones in the cabin) and determine a climate characteristic setting that results in a desired climate characteristic level in the cabin (and/or in the zone(s)). The climate characteristic may be any controllable characteristic, such as temperature, humidity (absolute and/or relative), heat index, air quality (e.g., which measures the amount of pollutants in the air), air flow (e.g., speed and/or direction of the air), etc. For example, passengers, flight crew members, and/or other occupants traveling in the cabin during flight often carry and use their personal mobile electronic devices, such as cell phones (e.g., a smart phone), laptop computers, tablets, wearable devices (e.g., a smart watch), etc. These mobile electronic devices are often equipped with sensors, such as temperature sensors (for providing temperature data to the user and/or for safety shut-down purposes), humidity sensors, etc. An example cabin air monitor disclosed herein gathers temperature readings from the personal mobile electronic devices and determines, based on the temperature readings and the current temperature setting of the ECS for the cabin, a new or updated temperature setting to implement in the cabin. In some examples, the cabin air monitor is implemented as a program or application operated on a mobile electronic device, such as a tablet, carried by a flight attendant or another flight crew member. The cabin air monitor may analyze the temperature distribution of the temperature readings from the mobile electronic devices and determine if the temperature setting for the cabin (and/or one or more zones in the cabin) should be raised or lowered to better control the temperature throughout the cabin. If the temperature setting should be increased or decreased, the flight attendant can manually change the temperature setting in the temperature control panel of the ECS. Thus, in some examples, use of the example cabin air monitor does not require any modification or alteration to the current aircraft or the aircraft ECS. In particular, rather than adding more temperature sensors throughout the cabin, altering the temperature controller logic, etc., which is costly and adds complex wiring systems to the aircraft, the examples disclosed herein can be used to more accurately regulate the temperature without having to make any changes to the aircraft or the ECS of the aircraft. Thus, the examples disclosed herein can be implemented with little or no cost.

In some examples, the cabin air monitor determines a new or updated temperature setting for the cabin or a zone within the cabin to result in the desired temperature. For example, if the current temperature setting (i.e., the desired temperature) is at 72° F. (22.2° C.), the cabin air monitor may determine that the temperature setting should be set at 70° F. (21.1° C.), which may result in a more consistent temperature of 72° F. (22.2° C.) across the cabin or zone. Additionally or alternatively, the cabin air monitor may determine a change to the current temperature setting, such as increasing or decreasing the current temperature setting by a certain degree (e.g., increase the current temperature setting by 2° F.).

In some examples, the temperature readings from the personal mobile electronic devices are transmitted to the mobile electronic device having the cabin air monitor over an in-flight entertainment system network. In some examples, the occupants, such as the passengers, are asked whether they wish to opt into the temperature sharing program before the data is transmitted or accessed. For example, many airlines have programs or applications for electronic devices that enable the personal mobile electronic devices to access the in-flight entertainment system network. The airline specific application or program may ask the passenger if he/she allows the program or application to retrieve temperature readings from the mobile electronic device and transmit the readings (and/or other data) to the cabin air monitor to enhance cabin air temperature control.

In some examples, in addition to the temperature readings from the personal mobile electronic devices, other aircraft data may be used to determine whether the temperature setting should be changed. In some examples, aircraft trend data such as stored weather data and/or stored temperature data (which indicates reoccurring warm and cold spots in the cabin) may be used in the determination. As another example, aircraft data such as the current phase of flight, the temperature reading(s) from the temperature sensor(s) in the cabin, and/or the external temperature may be used in the determination.

In some examples, one or more temperature readings from a personal mobile electronic device may be used to calibrate a temperature sensor in the cabin. For example, the cabin air monitor may use a temperature reading from a personal mobile electronic device associated with a person sitting closest to the temperature sensor to determine a temperature bias between the temperature in the cabin and the temperature sensed by the temperature sensor. The temperature bias may indicate whether there is a constant discrepancy between the air in the cabin and the temperature as measured by the temperature sensor. This temperature bias can be used in the determination of whether to adjust the temperature setting in the cabin.

In some examples, in addition to or as an alternative to analyzing the temperature data, the example methods, apparatus, systems, and articles of manufacture disclosed herein may be used to similarly obtain and regulate the humidity level in the cabin (and/or in the individual zones in the cabin). For example, some known aircraft include humidity controllers to control the amount of water vapor in the air. Personal mobile electronic devices may include humidity sensors that measure the humidity and/or relative humidity of the air. Similar to the temperature-related processes disclosed above, the examples disclosed herein may obtain humidity readings (e.g., measurements of the humidity and/or relatively humidity) from one or more of the personal mobile electronic devices and determine whether the humidity setting should be changed to result in a more controlled humidity across the cabin (or the individual zone). Further, the example methods, apparatus, systems, and articles of manufacture disclosed herein may be used to similarly obtain and regulate any other climate characteristic that can be controlled by the ECS, such as, for example, heat index, air quality (e.g., which measures the amount of pollutants in the air), and/or air flow.

Figure 2:
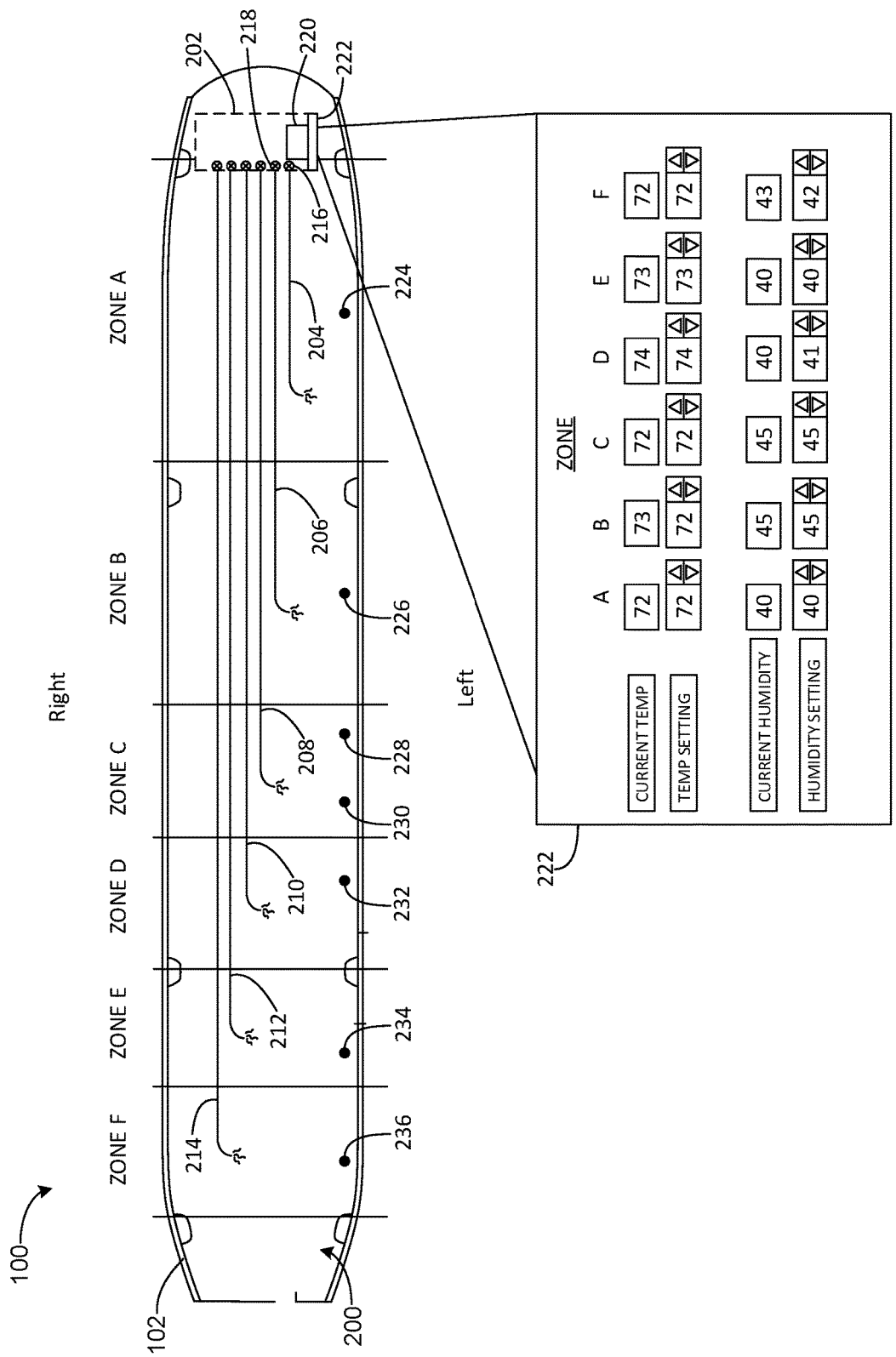
FIG. 2 is a schematic view of an example cabin and an example environmental control system (ECS) of the example aircraft of FIG. 1.

FIG. 1 illustrates an example aircraft 100 in which the examples disclosed herein may be implemented. In FIG. 1, the aircraft 100 includes a fuselage 102. FIG. 2 illustrates a schematic of an example cabin 200 defined by the fuselage 102 in which one or more occupants, including passengers and/or flight crew members (e.g., flight attendants), may travel. The cabin 200 may include multiple rows of seats (removed for clarity) in which the occupants may sit while flying.

To control the air temperature (and/or pressure, humidity, air quality, etc.) in the cabin 200, the example aircraft 100 includes an environmental control system (ECS) 202 (depicted as a dashed block in FIG. 2). The ECS 202 circulates air throughout the cabin 200 and controls the temperature of the air to provide a comfortable atmosphere while flying. In the illustrated example, the cabin 200 is divided into six zones: Zones A-F. The temperature in each zone can be independently controlled. In other examples, the cabin 200 may be divided into more or fewer zones. In some examples, such as with smaller aircraft, the entire cabin may be treated as a single zone and, thus, may be set to one temperature.

In the illustrated example, the ECS 202 provides air to each zone via a designated duct. For example, Zone A has a first duct 204, Zone B has a second duct 206, Zone C has a third duct 208, Zone D has a fourth duct 210, Zone E has a fifth duct 212, and Zone F has a sixth duct 214. The outlets of the ducts 204-214 may be located along the ceiling or overhead bins in the cabin 200. While the ducts 204-214 are illustrated as individual ducts, it is understood that any number of ducts and/or outlets for the ducts may be provided to each of the zones.

The ECS 202 mixes cold air (from one or more ECS packs) with recycled air from the cabin 200 and provides the air to each of the ducts 204-214. To control the temperature of the air, warmer air, sometimes referred to as trim air, is mixed with the colder air to produce the desired temperature air provided to the respective zones. In other words, the desired temperature is achieved by regulating the amount of the warm air that is mixed with the cold conditioned air exiting the ECS packs. For example, as illustrated in FIG. 2, a first damper or valve 216 regulates the amount of warm air that is mixed with the colder air and then provided through the first duct 204 to Zone A. Likewise, a second damper or valve 218 regulates the amount of warm air that is mixed with the colder air and then provided through the second duct 206 to Zone B, and so forth. Each of the dampers or valves is separately controllable to regulate the air flow to the respective zone to maintain the desired temperature setting.

In the illustrated example, the ECS 202 includes an ECS controller 220 (sometimes referred to as an ECS temperature controller) that controls the valves (e.g., the first valve 216) and other components of the ECS 202 based on the desired temperature settings to regulate the temperatures in the zones to the desired temperatures. A temperature control panel 222 (e.g., a thermostat) enables a flight attendant or other flight crew personnel to set the desired temperature for each zone. An enlarged view of the example temperature control panel 222 is illustrated in FIG. 2. As shown, the temperature control panel includes a digital display of the current temperature for each zone (as read by the respective temperature sensors), the current temperature setting for each zone, and an adjustment control to increase or decrease the temperature setting for each zone. The adjustment control may be implemented as a physical interface (e.g., one or more buttons, a dial, etc.) and/or a digital interface (e.g., a touchscreen). The ECS controller 220 uses feedback from one or more temperature sensors in the cabin 200 to regulate the temperature in each zone according to the respective temperature setting. In the illustrated example, seven temperature sensors 224-236 are disposed along the left side of the fuselage 102 in the cabin 200. Based on the current temperature settings and the temperature readings for each zone, the ECS controller 220 actuates the valves (e.g., the first valve 216) to control the temperature of the air provided via the ducts 204-214 to the respective zones. For example, based on a temperature setting for Zone A and the current temperature (as read by the first temperature sensor 224), the ECS controller 220 operates the first valve 216 to adjust the temperature of the air (warmer or cooler) provided through the first duct 204 to Zone A.

Further, in some examples, the relative humidity of the air provided to each zone may also controllable by the ECS controller 220. The ECS 202 may include one or more humidity controls (e.g., a humidifier, a dehumidifier, a vent, etc.) to adjust the relative humidity in each zone. As depicted in FIG. 2, the temperature control panel 222 may include a digital display of the current relative humidity for each zone (as measured by respective humidity sensors), the relative humidity setting for each zone, and an adjustment control to adjust the humidity level for each zone. In some examples, in addition to or as an alternative to the temperature and/or humidity, the temperature control panel 222 may include a heat index setting for one or more of the zones in the cabin 200. A heat index, sometimes referred to as felt air temperature or apparent temperature, is based on both temperature and humidity and represents the human-perceived temperature. In still other examples, the ECS controller 220 may control other characteristics of the air provided by the ECS 202, such as the air flow (including the air speed and/or direction) and/or the air quality.

While the example temperature control panel 222 is depicted as being in the rear of the cabin 200, it is understood that the temperature control panel 222 may be disposed anywhere within the cabin 200 that is accessible by a flight attendant or other aircraft personnel. Further, the ECS 202 and the ECS controller 220 may incorporate many components (e.g., bleed air systems, ECS packs, ducts, filters, etc.) and may be disposed in other locations throughout the aircraft 100.

As shown in FIG. 2, there are a limited number of temperature sensors 224-236 employed in the cabin 200 of the aircraft 100, and the temperature sensors 224-236 are disposed in the same relative location in each of the zones. While the temperature sensors 224-236 may provide a rough or general reading of the temperature in the respective zones, there are often pockets of warmer and/or colder air in the cabin 200. For example, the first temperature sensor 224 in Zone A may read the temperature as 72° F. (22.2° C.). However, on the right side of the cabin 200, the temperature may be warmer or colder. Thus, passengers and/or flight crew members further from the temperature sensors 224-236 may be uncomfortable due to the warmer or colder air. Further, in the larger zones (e.g., economy zones), such as Zones A and B, only one temperature sensor is often provided. However, it is difficult to accurately determine the temperature of the entire zone based on just one temperature sensor because there are often large variances in temperature throughout the zone. While adding additional sensors in the cabin 200 may help address the above-drawbacks, ECS temperature sensors are costly and require complex wiring systems.

Further, these additional sensors and wiring systems increase the weight of the aircraft 100 and, thus, lead to decreased fuel efficiency. Disclosed herein are example methods, apparatus, systems, and articles of manufacture that can help more accurately determine the temperature, relative humidity, and/or any other climate characteristic in the cabin 200 (and/or in each zone) without adding additional sensors and wiring. Thus, the examples disclosed herein can be used to more accurately track and adjust the temperature, relative humidity, and/or any other climate characteristic in the cabin 200 without adding costs to the aircraft 100.

Figure 3:
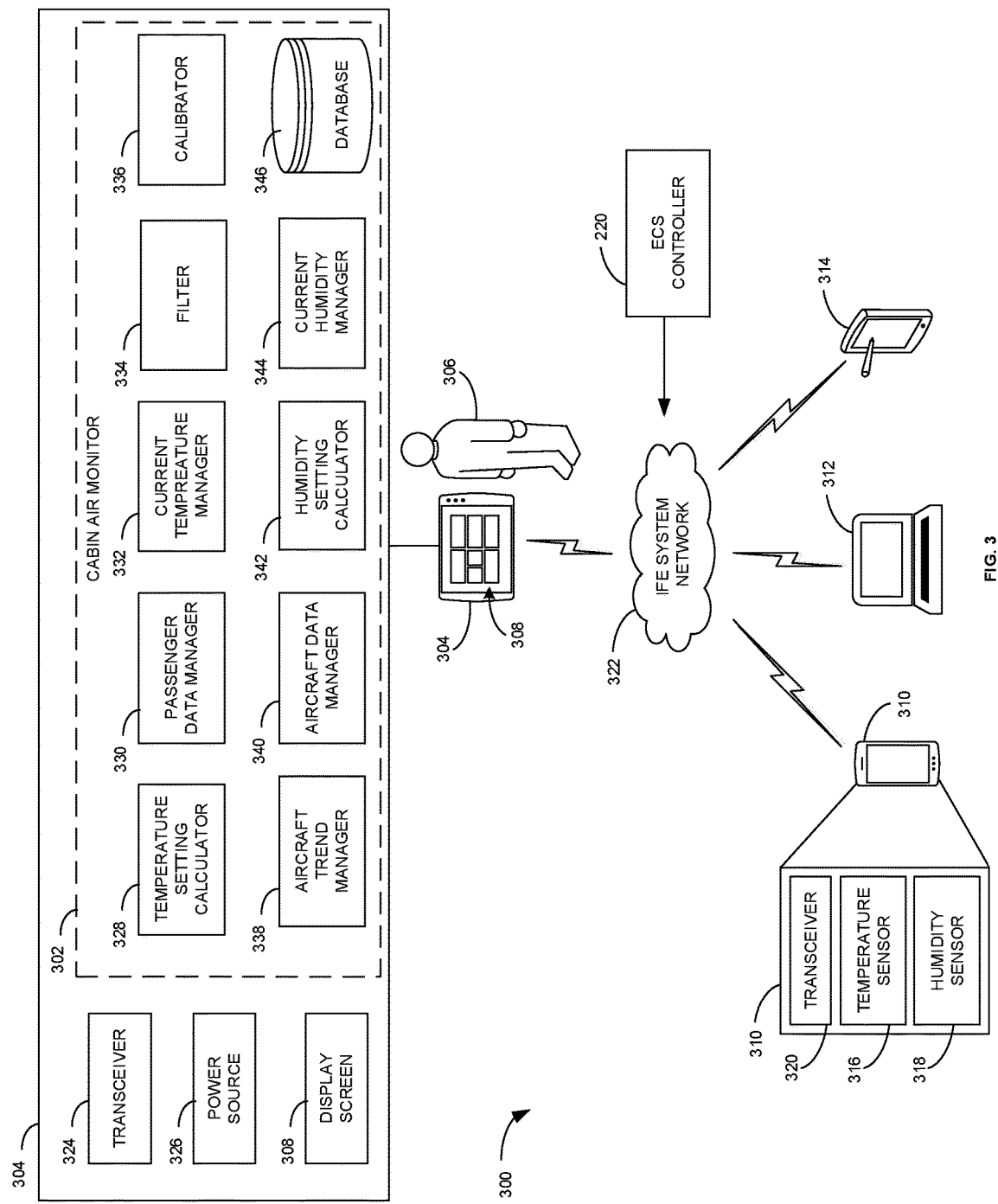
FIG. 3 illustrates an example cabin air control system including an example cabin air monitor implemented on an example flight attendant electronic device that may be used to monitor and/or regulate temperature, relative humidity, and/or any other climate characteristic in the example cabin of FIG. 2.

FIG. 3 illustrates an example cabin air control system 300 that may be implemented in the example aircraft 100 of FIGS. 1 and 2 to more accurately regulate the temperature, relative humidity and/or any other air or climate characteristic in the different zones of the cabin 200. The example cabin air control system 300 leverages climate characteristic values (e.g., temperature and/or relative humidity readings) measured by personal mobile electronic devices in the cabin 200 of the aircraft 100. The personal mobile electronic devices may be owned and/or operated by occupants of the cabin 200, such as the passengers, the flight crew, etc. For instance, mobile electronic devices such as cell phones, laptops, tablets, wearable devices, etc. often include temperature sensors and/or relative humidity sensors. In the illustrated example, the cabin air control system 300 includes a cabin air monitor 302 that obtains and analyzes temperature readings and/or relative humidity readings from the personal mobile electronic devices and determines whether the temperature setting and/or relative humidity setting in each zone should be changed to result in a temperature and/or relative humidity that is closer to the desired temperature and/or relative humidity throughout the respective zone. In the illustrated example, the cabin air monitor 302 is implemented on a mobile electronic device 304 that is used and controlled by a flight attendant 306. The cabin air monitor 302 may be a program or application executed by a processor of the mobile electronic device 304. To avoid confusion with other mobile electronic devices disclosed herein, the mobile electronic device 304 is referred to herein as a flight attendant electronic device 304. However, it is understood that the mobile electronic device 304 could be operated or controlled by any other person, such as another aircraft personnel (e.g., a pilot, a maintenance worker, etc.), a passenger, and/or any other occupant of the aircraft 100. In the example of FIG. 3, the flight attendant electronic device 304 is depicted as a tablet, which is a personal mobile electronic device with a display screen 308. The flight attendant electronic device 304 may be carried around the cabin 200 by the flight attendant 306 to monitor various cabin air characteristic during the flight. However, in other examples, the flight attendant electronic device 304 may be implemented as any other mobile electronic device, such as a cell phone (e.g., a smart phone), a laptop computer, etc. The flight attendant electronic device 304 is represented twice in FIG. 3, once as a mobile electronic device and once by a block diagram (disclosed in further detail herein).

In the illustrated example, the cabin air monitor 302 obtains and analyzes the temperature and/or relative humidity readings or values from one or more personal mobile electronic devices in the cabin 200 (FIG. 2) and determines whether the current temperature setting and/or current relative humidity setting for each of the zones should be changed to result in a more consistent temperature and/or relative humidity that matches the desired temperature and/or relative humidity in the respective zones. The flight attendant electronic device 304 may display the updated or new settings on the display screen 308 to the flight attendant 306, who can then manually change the settings at the temperature control panel 222 (FIG. 2). In some instances, it is desired to prevent personal mobile electronic devices (such as those owned by passengers) from communicating directly with any aircraft control system to prevent tampering (e.g., hacking). Thus, rather than having the cabin air monitor 302 implemented directly in the ECS controller 220, the cabin air monitor 302 is implemented in the flight attendant electronic device 304, which separates any potential communication link from the personal mobile electronic devices to the ECS controller 220. By using the flight attendant electronic device 304 to display the results (e.g., the updated temperature and/or relative humidity setting(s), change(s) to the temperature and/or relative humidity setting(s), etc.), the flight attendant 306 continues to manually enter the changes into the ECS 202 (FIG. 2). In this manner, the example cabin air control system 300 may comply with any aircraft security protocols. Further, by implementing the cabin air monitor 302 in the flight attendant electronic device 304, rather than directly in the ECS controller 220, no alternations or new programs are needed for the ECS controller 220. As such, the example cabin air control system 300 can be easily used or adapted in any current or future aircraft with minimal (if any) modification to the aircraft 100.

The example cabin air monitor 302 may receive one or more temperature and/or relative humidity readings from one or more passenger mobile electronic devices. In the illustrated example, three example passenger electronic devices are depicted: a first passenger electronic device 310, a second passenger electronic device 312, and a third passenger electronic device 314. However, it is understood that the temperature readings may be transmitted from fewer or more passenger electronic devices. Thus, whenever referring to the passenger electronic devices 310-314 in the disclosed examples, it is understood that the example may use any number of electronic devices (e.g., one, ten, twenty, etc.). Further, while many of the examples disclosed herein are described in connection with obtaining data from mobile electronic devices owned and/or operated by passengers, it is understood the example cabin air monitor 302 may similarly receive data from other mobile electronic devices in the cabin 200, such as those owned and/or operated by the flight attendant(s), the pilot(s), and/or any other person or entity (e.g., electronic devices owned by the airline and used by passengers during the flight). Therefore, whenever referring to a passenger or a passenger electronic device, the same aspect may be similarly applied to a mobile electronic device owned or operated by any other person or entity, whether the mobile electronic device is carried on a person's body or located separate from the person (e.g., in an overhead bin). As such, the flight attendant electronic device 304, which implements the cabin air monitor 302, may be considered a primary or master mobile electronic device, and the personal electronic devices that are used to gather climate measurements may be considered secondary or slave mobile electronic devices.

In the illustrated example, the first passenger electronic device 310 is depicted as smart phone. The first passenger electronic device 310 is also represented as a block diagram in FIG. 3. In the illustrated example, the first passenger electronic device 310 includes a temperature sensor 316 (which may be inside a casing of the phone) that obtains temperature readings. The temperature readings may be used to inform the user of the current temperature surrounding the first passenger electronic device 310, to prevent from the first passenger electronic device 310 from over-heating or freezing, etc. Additionally or alternatively, the first passenger electronic device 310 may include a humidity sensor 318 to determine the relative humidity in the air around the first passenger electronic device 310. In the illustrated example, the first passenger electronic device 310 also includes a transceiver 320, which may be used to send and/or receive information wirelessly, such as through Wi-Fi, Bluetooth®, cellular radio, etc. The second and third passenger electronic devices 312, 314 (which are depicted as a laptop computer and a tablet, respectively) may similarly include transceivers, temperature sensors, and/or humidity sensors. In other examples, the passenger electronic devices 310-314 may include other types of electronic devices, such as a wearable device (e.g., a smart watch) or any other any other type of electronic device having a temperature sensor and/or humidity sensor and a transceiver. The passenger electronic devices 310-314 may be owned and/or operated by one or more passengers in the same zone or different zones. As mentioned above, in other examples, more or fewer passenger electronic devices may be utilized, depending on the number of passengers in each zone and their authorization to share temperature and/or humidity data, as disclosed in further detail herein.

In some examples, the temperature and/or humidity readings from the passenger electronic devices 310-314 are transmitted to the flight attendant electronic device 304 over an in-flight entertainment (IFE) system network 322. For instance, the aircraft 100 (FIGS. 1 and 2) may be equipped with an IFE system having a wireless network that enables electronic devices to access the internet, make calls, watch movies, etc. during the flight. In some examples, an airline may have a specific programs or application that enables electronics devices to access the IFE system network 322. The airline specific program or application can be downloaded or accessed via an internet browser to communicate with the IFE system network 322.

In some examples, prior to accessing the temperature and/or humidity readings on the passenger electronic devices 310-314, the cabin air monitor 302 may request authorization from the passenger electronic devices 310-314 to obtain the temperature and/or humidity data. For example, an authorization message may be presented on the passenger electronic devices 310-314 (e.g., via the airline specific application or program) that asks the associated persons if they would like to opt into a data sharing program so that the cabin temperature and/or relative humidity can be more accurately tracked and regulated. If a passenger declines, the temperature and/or relative humidity readings are not sent from the passenger's electronic device. If the passenger agrees, the temperature and/or relative humidity readings are sent (e.g., periodically, such as every minute or five minutes) to the cabin air monitor 302 of the flight attendant electronic device 304. In other examples, a passenger may automatically approve such data transfer at the time of downloading or accessing the airline specific program or application. In some examples, the passenger electronic devices 310-314 may transmit the temperature and/or humidity information to the flight attendant electronic device in other manners, such as via Bluetooth®.

In the illustrated example, the flight attendant electronic device 304 includes a transceiver 324. Similar to the transceiver 320 in the first passenger electronic device 310, the transceiver 324 in the flight attendant electronic device 304 may be used to send and/or receive data over the IFE system network 322. In some examples, the transceiver 324 is a Bluetooth® transceiver and may be used to send and/or receive data to/from the passenger electronic devices 310-314 via a Bluetooth® connection. In the illustrated example, the flight attendant electronic device 304 also includes a power source 326 (e.g., a battery) and the display screen 308.

In the example of FIG. 3, the cabin air monitor 302 includes a temperature setting calculator 328, a passenger data manager 330, a current temperature manager 332, a filter 334, a calibrator 336, an aircraft trend manager 338, an aircraft data manager 340, a humidity setting calculator 342, a current humidity manager 344, and a database 346. As disclosed in further detail herein, the temperature setting calculator 328 analyzes information from one or more sources and determines whether the current temperature settings for the zones of the cabin 200 should be adjusted (e.g., increased or decreased) to meet the desired temperatures for the respective zones.

Figure 4:
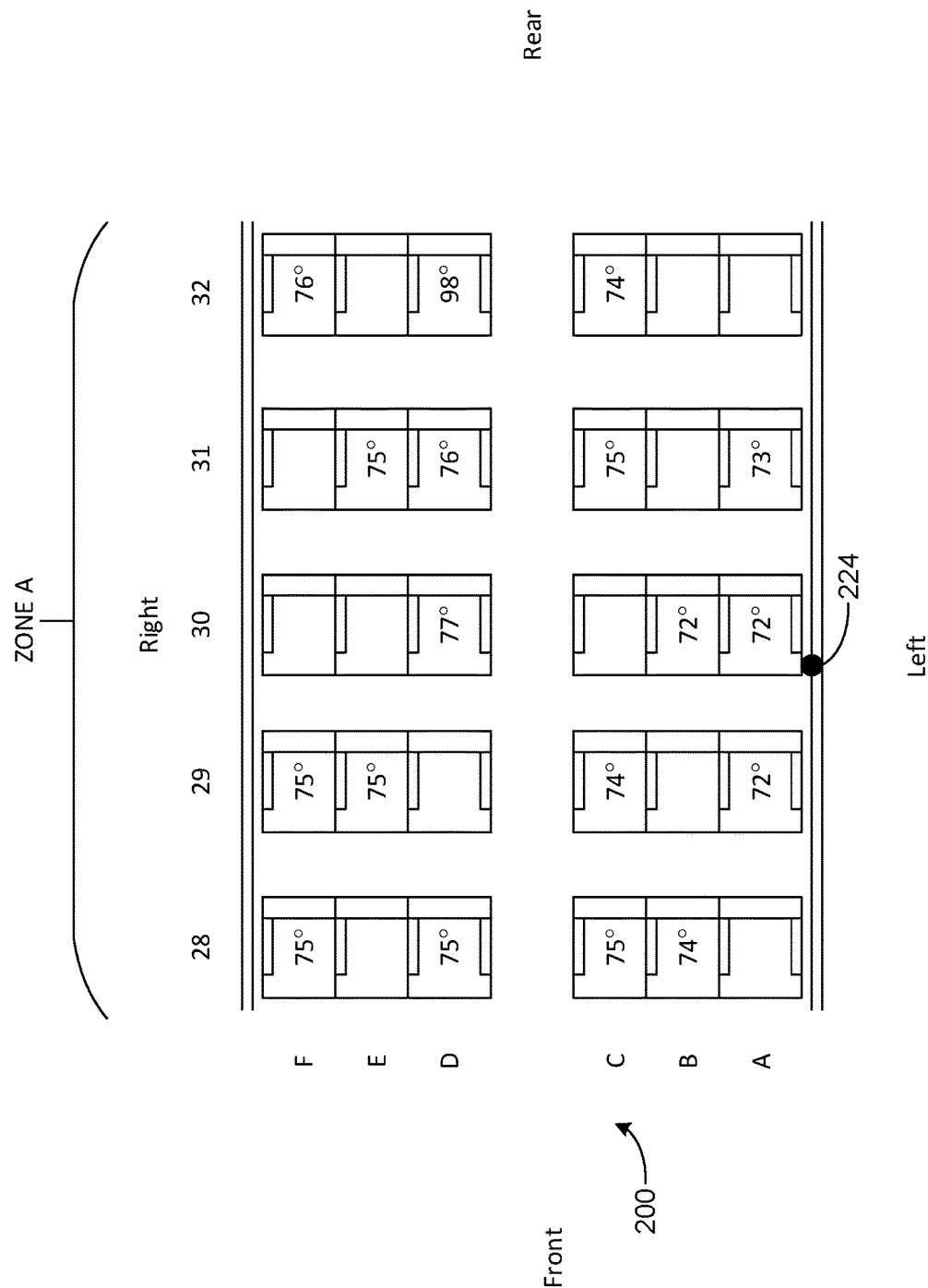
FIG. 4 depicts an example temperature distribution as measured by a plurality of passenger electronic devices in a zone of the example cabin of FIG. 2.

In the illustrated example, the passenger data manager 330 accesses (gathers or obtains) the temperature readings from the passenger electronic devices 310-314. In some examples, the temperature readings are sent from the passenger electronic devices 310-314 to the cabin air monitor 302 over the IFE system network 322. In some examples, only one passenger electronic device (e.g., the first passenger electronic device 310) may supply temperature readings to the cabin air monitor 302 (e.g., because only one passenger agreed to share data, because only one passenger is in the zone, because only one passenger's data is reliable, etc.). In other examples, multiple passenger electronic devices may supply temperature readings to the cabin air monitor 302. In some examples, the passenger data manager 330 associates the temperature reading(s) from each passenger electronic device with the passenger's seat to determine a location of the respective temperature reading in the cabin 200 (FIG. 2). In some examples, such as with a cabin having multiple zones, the passenger data manager 330 uses the seat information to associate the temperature reading(s) with the corresponding zones. In some examples, seat information is transmitted with the temperature reading to the cabin air monitor 302 (e.g., over the IFE system network 322 to the flight attendant electronic device 304). For instance, an airline specific program or application (which may be implemented on the passenger electronic devices 310-314, for example) may store the passenger's flight information, including flight times, the passenger's name, the assigned seat for the passenger, etc. The passenger specific information may be sent with the temperature readings to the flight attendant electronic device 304. In other examples, the airline specific program or application implemented on the passenger electronic devices may ask the passenger to input his/her designated seat (such as in airlines that do not have pre-assigned seats). In still other examples, the passenger data manager 330 may compare the passenger's name to a seating chart for the flight stored in the database 346. For instance, when the temperature reading is sent, the temperature reading may include the name (or another identifier) of the passenger associated with the temperature reading, which is then cross-referenced with the passenger seating chart to determine the location of the temperature reading. In some examples, the passenger data manager 330 generates a temperature profile or distribution for the cabin 200 and/or one or more the zones based on the locations of the temperature readings. An example temperature distribution is illustrated in FIG. 4 and disclosed in further detail herein.

In the illustrated example of FIG. 3, the current temperature manager 332 obtains or determines the current temperature setting and/or desired temperature for each zone in the cabin 200. In some examples, the current temperature setting is indicative of the desired temperature for the respective zone. In other examples (such as after the example processes disclosed herein are used to change the current temperature setting), the desired temperature setting may be different from the current temperature setting. In some examples, the current temperature setting and/or desired temperature setting for each zone is input into the flight attendant electronic device 304 by the flight attendant 306 (e.g., via a touch screen, via a keyboard, via a stylus, etc.). For example, after or while the flight attendant 306 adjusts the temperature settings on the temperature control panel 222 (FIG. 2), the flight attendant 306 may input the current temperature settings for each zone into the cabin air monitor 302. Additionally or alternatively, the current temperature settings may be transmitted to the flight attendant electronic device 304 from the ECS controller 220. For example, the ECS controller 220 may generate a signal that broadcasts the current temperature settings for the zones and/or the temperature readings from the temperature sensors 224-236 (FIG. 2) over the IFE system network 322. In some examples, the current temperature settings and/or temperature sensor readings can be viewed by the passengers via the airline specific application on the passenger electronic devices 310-314. In other examples, the ECS controller 220 may transmit the information directly to the flight attendant electronic device 304 (e.g., via Bluetooth®).

In the illustrated example, the temperature setting calculator 328 analyzes the one or more temperature readings from the passenger electronic device(s) 310-314, provided by the passenger data manager 330, and the current temperature setting for a zone, provided by the current temperature manager 332, and determines whether the current temperature setting should be adjusted (e.g., increased or decreased) to meet the desired temperature for the zone. For example, referring briefly to FIG. 4, an example temperature distribution of Zone A is depicted showing example temperatures obtained from different passengers in various seats in the zone. In FIG. 4, Zone A includes five rows (28-32) each with six seats (A-F). Example temperature readings are shown in different seats where temperature readings were taken. Assume, for example, the current temperature setting for Zone A is set to 72° F. (22.2° C.) (and which is the desired temperature for Zone A). As illustrated, the first temperature sensor 224 is located along the left side of the cabin 200 near seat 30A. As shown, the temperature readings from the passenger electronic devices around this area are about 72° F. (22.2° C.). As such, without the benefit of additional data, the ECS 202 (FIG. 2) determines the temperature in Zone A is 72° F. (22.2° C.). However, as shown by the temperature readings associated with the other seats (especially on the right side of the cabin 200), the temperatures in other parts of Zone A are different (warmer) than the desired temperature. As such, the passengers sitting away from the first temperature sensor 224 may be uncomfortable and displeased with the temperature in the cabin 200. By analyzing the temperature readings of the passenger electronic devices in Zone A and the current temperature setting, the temperature setting calculator 328 determines whether the temperature setting should be increased or decreased to result in the desired temperature in the zone. For instance, the temperature setting calculator 328 may determine that the temperature setting should be decreased by 2° F. (to 70° F. (21.1° C.)), which may result in a more consistent (e.g., average) temperature across Zone A that is closer to the desired temperature.

Referring back to FIG. 3, in some examples, the temperature setting calculator 328 determines or calculates a new or updated temperature setting based on the one or more temperature readings from the passenger electronic device(s) 310-314 and the current temperature setting. Additionally or alternatively, the temperature setting calculator 328 may calculate a change (e.g., increase by 2° F.) to the current temperature setting. In some examples, the temperature setting calculator 328 displays the updated temperature setting and/or the change to the current temperature setting on the display screen 308 to the flight attendant 306, who can then change the current temperature setting on the temperature control panel 222 (FIG. 2). The updated temperature setting and/or change may result in a temperature in the zone that is more consistent with the desired temperature for the zone. In some examples, the temperature setting calculator 328 calculates the updated temperature setting and/or change based on an average or median of the temperature readings in the zone. For example, the median temperature in Zone A in FIG. 4 is 75° F. (23.9° C.). In such an example, the temperature setting calculator 328 may determine the temperature setting for Zone A should be decreased by 3° F. and/or set to 69° F. (20.6° C.) (the updated temperature setting) to result in a median temperature of 72° F. (22.2° C.) for Zone A, which may be more pleasing to a greater number of passengers in Zone Z. In some examples, temperature readings from mobile electronic devices associated with persons that are further from the first temperature sensor 224 may be weighted higher than temperature readings from passengers that are closer to the first temperature sensor 224. In other examples, other temperature control algorithms or logic may be implemented (e.g., machine learning algorithms). After the temperature setting is changed, the temperature setting calculator 328 reanalyzes the temperature readings from the passenger electronic devices 310-314, the desired temperature, and/or the current temperature setting to determine if the temperature setting should be changed again. These measurements and analyses may be repeated periodically (e.g., every three minutes, five minutes, etc.) to constantly check and update for variances in the temperature. In some examples, after changing the temperature setting, the flight attendant 306 enters the new temperature setting into the flight attendant electronic device 304 and/or the new temperature setting is transmitted over the IFE system network 322 to the cabin air monitor 302, which is then used in the subsequent round of analysis. These example processes may be similarly performed for each of the other Zones B-F in the cabin 200.

In some examples, the cabin air monitor 302 includes the filter 334 to identify and remove erroneous or anomalous temperature readings before being analyzed by the temperature setting calculator 328 and/or the passenger data manager 330. For example, as shown in FIG. 4, the passenger electronic device in seat 32D produced a temperature reading of 98° F. (36.7° C.), which is significantly higher than the other temperature readings in Zone A. This may be due to the fact that the passenger has the electronic device in his/her pocket. As such, the temperature reading is not indicative of the actual air temperature in Zone A and the filter 334 excludes the temperature reading from the analysis to prevent inaccurate temperature readings from negatively affecting the temperature setting calculation. In some examples, the filter 334 removes temperature readings based on a threshold. For example, the filter 334 may remove any temperature reading beyond a threshold temperature (e.g., ±7° F. from a median temperature in Zone A). Additionally or alternatively, the filter 334 may use other algorithms or logic to identify and remove outlier temperature readings. For example, the filter 334 may determine the quality of the reading(s) based on the state of the passenger electronic device while the measurement is taken, such as whether the passenger electronic device is in use or not (e.g., in a sleep mode). For example, if the passenger is watching a movie or playing a game on the passenger electronic device, the state of the passenger electronic device indicates the electronic device is out and exposed to the air in the cabin 200, which may be considered a valid reading. In some examples, the passenger electronic device transmits the state of the electronic device along with the reading(s) to the cabin air monitor 302. As another example, the filter 334 may determine the quality of the reading(s) based on whether the passenger electronic device is moving, such as when the passenger is walking around the cabin 200 with the electronic device in their pocket. In some such examples, the filter 334 may determine that a reading is not valid until the electronic device has stopped moving for a period of time (e.g., 30 seconds). In some examples, the passenger electronic device transmits the location and/or movement data along with the reading(s) to the cabin air monitor 302. As another example, the filter 334 may use a reading from a light sensor on the passenger electronic device to determine whether the passenger electronic device is stowed away (e.g., in the passenger's pocket) or not. This information may be transmitted by the passenger electronic device to the cabin air monitor 302. In some examples, the filter 334 may use Wi-Fi localization to determine which seat a passenger is in and whether the passenger is in their seat or moving around the cabin 200.

In some examples, prior to, during, and/or after the passenger temperature data is used to determine the updated temperature setting and/or change to the current temperature setting, the first temperature sensor 224 may be calibrated by the calibrator 336. The calibrator 336 determines a temperature bias for the first temperature sensor 224 based on the difference between a first temperature reading from the first temperature sensor 224 and a second temperature reading from a passenger electronic device associated with a seat closest to the first temperature sensor 224. A temperature bias may be caused by various factors. For example, the first temperature sensor 224 may be disposed in a ceiling panel in the cabin 200 and, thus, may be affected by the rising warm air in the cabin 200. For instance, referring briefly to FIG. 4, assume the temperature reading of the first temperature sensor 224 is 73° F. (22.8° C.), while the temperature reading from the passenger electronic device associated with seat 30A is 72° F. (22.2° C.). As such, the calibrator 336 determines the temperature bias associated with the first temperature sensor 224 is +1° F. The calibrator 336 may store this bias temperature in the database 346 as associated with the first temperature sensor 224 for Zone A. In some examples, the temperature setting calculator 328 uses the temperature bias for the first temperature sensor 224 when calculating the updated temperature setting and/or change to the current temperature setting for Zone A.

In some examples, only a temperature reading from the closest seat next to the first temperature sensor 224 is used. For example, a seating chart may be stored in the database 346 that indicates which seat is next to the first temperature sensor 224. For instance, referring briefly to FIG. 4, only a temperature reading from a passenger electronic device associated with the passenger in seat 30A would be used by the calibrator 336. In other examples, if a temperature reading is not available from the closest seat, a temperature reading from another seat within a threshold distance (e.g., a two seat radius) from the first temperature sensor 224 may be used. In still other examples, a combination (e.g., an average) of multiple temperature readings from multiple seats around the first temperature sensor 224 may be used to calibrate the first temperature sensor 224. Similarly, the calibrator 336 may calibrate each of the other temperature sensors 226-236 for each of the other zones and the temperature setting calculator 328 may use the temperature biases when calculating the temperature settings and/or changes to the temperature settings in the other zones.

Further, in some examples, the calibrator 336 may use historical data to determine if a temperature sensor is defective. For example, if the calibrator 336 determines that during the last ten flights the first temperature sensor 224 has been reading a temperature that is 10° or more different than the closest mobile electronic device, the calibrator 336 may determine the first temperature sensor 224 is defective. In some such examples, the calibrator 336 may output an alarm or indicator on the display screen 308 to alert the flight attendant 306 that the first temperature sensor 224 may need to be replaced or repaired. Additionally or alternatively, a discrepancy between the reading from the first temperature sensor 224 and/or one or more readings from personal mobile electronic devices can be used by the calibrator 336 for health management of the aircraft 100, such as detecting defective door and/or window seals, detecting blocked air vents around certain regions, etc.

In some examples, the temperature setting calculator 328 uses other types of data to enhance the calculation of the updated temperature settings and/or changes to the current temperature settings. As illustrated in FIG. 3, the cabin air monitor 302 includes the aircraft trend manager 338. The aircraft trend manager 338 analyzes historical flight data and determines one or more aircraft trends relating to temperature patterns in the cabin 200. The historical data may include, for example, temperature settings and/or temperature readings from passenger electronic devices from previous flights, weather encountered by the aircraft 100 during the previous flights, time of year of the previous flights, flight path of the previous flights, number of passengers during the previous flights, location of passengers in the cabin 200 during the previous flights, and/or other parameters that may affect the temperature and/or air flow in the cabin 200. The aircraft trend manager 338 may determine one or more aircraft trends based on the historical data, such as the locations of reoccurring hot and/or cold spots in the cabin 200. In some examples, historical data from previous flights having similar flight characteristics (e.g., same time of year, same flight path, same number of passengers, etc.) may be used to further help determine aircraft trends for the flight. In some examples, the temperature setting calculator 328 uses the aircraft trends when calculating the updated temperature settings and/or changes to the current temperature settings for the different zones. Further, in some examples, the temperature setting calculator 328 uses the aircraft trends to calculate a start or base temperature setting for one or more of the zones in the cabin 200. For example, the aircraft trend data may indicate that the temperature in Zone A is usually 2° F. warmer than the desired temperature during loading. As such, the temperature setting calculator 328 may determine that the temperature for Zone A should be set 2° F. cooler to offset the typically warmer zone.

Additionally or alternatively, in some examples, other aircraft data may be used to enhance the calculation of the updated temperature settings and/or changes to the current temperature settings. For example, the aircraft data manager 340 obtains and/or analyzes current aircraft data such as the phase of flight of the aircraft 100 (e.g., loading, take-off, cruise, etc.), temperature readings from the temperature sensors 224-236 (FIG. 2), external temperature readings (e.g., from temperature sensors on the outside of the aircraft 100), etc. This information may be provided to the temperature setting calculator 328 and used to calculate the updated temperature settings and/or changes to the current temperature settings for the different zones.

In some examples, similar to the temperature readings from the passenger electronic devices 310-314, the passenger data manager 330 accesses relative humidity readings from the passenger electronic devices 310-314. Similar to the temperature setting calculator 328, in some examples, the humidity setting calculator 342 calculates an updated relative humidity setting and/or change to the relative humidity setting for one or more of the zones in the cabin 200 based on the one or more relative humidity readings from the passenger electronic device(s) 310-314 and the current relative humidity setting for the respective zone. The current relative humidity settings may be input via the flight attendant 306 and/or transmitted from the ECS controller 220 over the IFE system network 322, for example. The humidity setting calculator 342 may present the updated relative humidity settings and/or changes to the current relative humidity settings to the flight attendant 306 on the display screen 308, such that the flight attendant can make the changes to the temperature control panel 222 (FIG. 2). In some examples, the humidity setting calculator 342 uses the aircraft trend data, the aircraft data, and/or the calibrator data to calculate the updated relative humidity setting or change to the current relative humidity setting. While in the illustrated the cabin air monitor 302 includes both the temperature setting calculator 328 and the humidity setting calculator 342, in other examples, the cabin air monitor 302 may only operate to monitor and/or regulate one of the temperature or the relative humidity. In some examples, in addition to or as an alternative to the temperature and/or relative humidity control, the cabin air monitor 302 may operate to monitor and/or regulate a heat index value, which is based on the combination of temperature and humidity. In such an example, changing the heat index value may result in changes to one or both of the temperature and the relative humidity.

In the illustrated example the flight attendant electronic device 304 is implemented as a tablet. However, in other examples, the flight attendant electronic device 304 may be implemented as another portable electronic device, such as laptop computer, a cell phone, a wearable device (e.g., a smart watch), etc. so that the flight attendant 306 can carry the flight attendant electronic device 304 around the aircraft 100. In other examples, the flight attendant electronic device 304 may be a stationary electronic device (e.g., a computer) mounted to a wall or panel in the cabin 200, such as near the temperature control panel 222 (FIG. 2), for example.

In some examples, instead of having the flight attendant 306 and/or other flight crew member manually enter the updated setting and/or change to the current setting in the temperature control panel 222, the cabin air monitor 302 may transmit, based on an action or confirmation from the flight attendant 306, a signal or instruction to the ECS controller 220 to change the setting. In other words, the cabin air monitor 302 may remotely control the settings of the ECS 202. For example, cabin air monitor 302 may display the results of the temperature analysis on the display screen 308 of the flight attendant electronic device 304. The cabin air monitor 302 may also display an option on the display screen 308 to change the temperature setting to the newly calculated temperature setting or another temperature setting. If the flight attendant 306 confirms (e.g., by pressing a button on the display screen 308 or another input device), the cabin air monitor 302 transmits a signal (e.g., over the IFE system network 322) to the ECS controller 220. Thus, in some examples, the flight attendant 306 does not need to manually enter the changes into the temperature control panel 222 (FIG. 2) and, thus, the flight attendant 306 can be in another part of the aircraft 100 and still control the ECS 202 (FIG. 2). Nonetheless, this example still uses a manual confirmation or action by the flight attendant 306, thereby complying with any security protocols by preventing a direct communication link between the mobile electronic devices (e.g., passenger electronic devices) and the ECS 202 (FIG. 2).

In still other examples, instead of being implemented in the flight attendant electronic device 304, the cabin air monitor 302 may be implemented in the ECS controller 220 (FIG. 2). In such an example, the cabin air monitor 302 may automatically interface with the ECS 202 to regulate the temperature and/or relative humidity in the different zones of the aircraft (e.g., by actuating one or more of the valves).

As mentioned above, in addition to or as an alternative to obtaining temperature and/or humidity readings from the passenger mobile electronic devices, the cabin air monitor 302 may obtain temperature and/or humidity readings from one or more mobile electronic devices (such as the flight attendant electronic device 304) owned and/or operated by another person or entity. For example, the flight attendants and/or other flight crew members often have electronic devices, such as cell phones, tablets, laptop computers, etc. The flights attendants and other crew members are also typically assigned a designated seat (e.g., in the front or rear of the cabin 200). The cabin air monitor 302 may obtain temperature and/or humidity readings from the flight attendant electronic devices and correlate the readings to specific locations in the cabin 200 to enhance the temperature and/or relative humidity analysis in accordance with the teachings disclosed herein.

While the examples above are described in connection with air temperature and relative humidity, the examples may likewise be implemented to control any other air or climate characteristic (e.g., heat index, air quality, air flow, etc.) based on data from mobile electronic devices. For example, mobile electronic devices may include one or more sensors that can measure air flow (speed and/or direction), heat index, air quality, etc., and the information can be used by the cabin air monitor 302 to monitor and/or regulate the corresponding characteristic via the ECS 202. Further, while the examples are disclosed in connection with an aircraft cabin, the example methods, apparatus, systems, and articles of manufacture may be similarly used to control the air temperature and/or humidity in cabins of other transportation vehicles, such as on a bus, a train, a boat, etc.

While an example manner of implementing the cabin air monitor 302 is illustrated in FIG. 3, one or more of the elements, processes and/or devices illustrated in FIG. 3 may be combined, divided, re-arranged, omitted, eliminated and/or implemented in any other way. Further, the example temperature setting calculator 328, the example passenger data manager 330, the example current temperature manager 332, the example filter 334, the example calibrator 336, the example aircraft trend manager 338, the example aircraft data manager 340, the example humidity setting calculator 342, the example current humidity manager 344, and/or, more generally, the example cabin air monitor 302 of FIG. 3 may be implemented by hardware, software, firmware and/or any combination of hardware, software and/or firmware. Thus, for example, any of the example temperature setting calculator 328, the example passenger data manager 330, the example current temperature manager 332, the example filter 334, the example calibrator 336, the example aircraft trend manager 338, the example aircraft data manager 340, the example humidity setting calculator 342, the example current humidity manager 344, and/or, more generally, the example cabin air monitor 302 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example temperature setting calculator 328, the example passenger data manager 330, the example current temperature manager 332, the example filter 334, the example calibrator 336, the example aircraft trend manager 338, the example aircraft data manager 340, the example humidity setting calculator 342, and/or the example current humidity manager 344 is/are hereby expressly defined to include a non-transitory computer readable storage device or storage disk such as a memory, a digital versatile disk (DVD), a compact disk (CD), a Blu-ray disk, etc. including the software and/or firmware. Further still, the example cabin air monitor of FIG. 3 may include one or more elements, processes and/or devices in addition to, or instead of, those illustrated in FIG. 3, and/or may include more than one of any or all of the illustrated elements, processes and devices.

Figure 5:
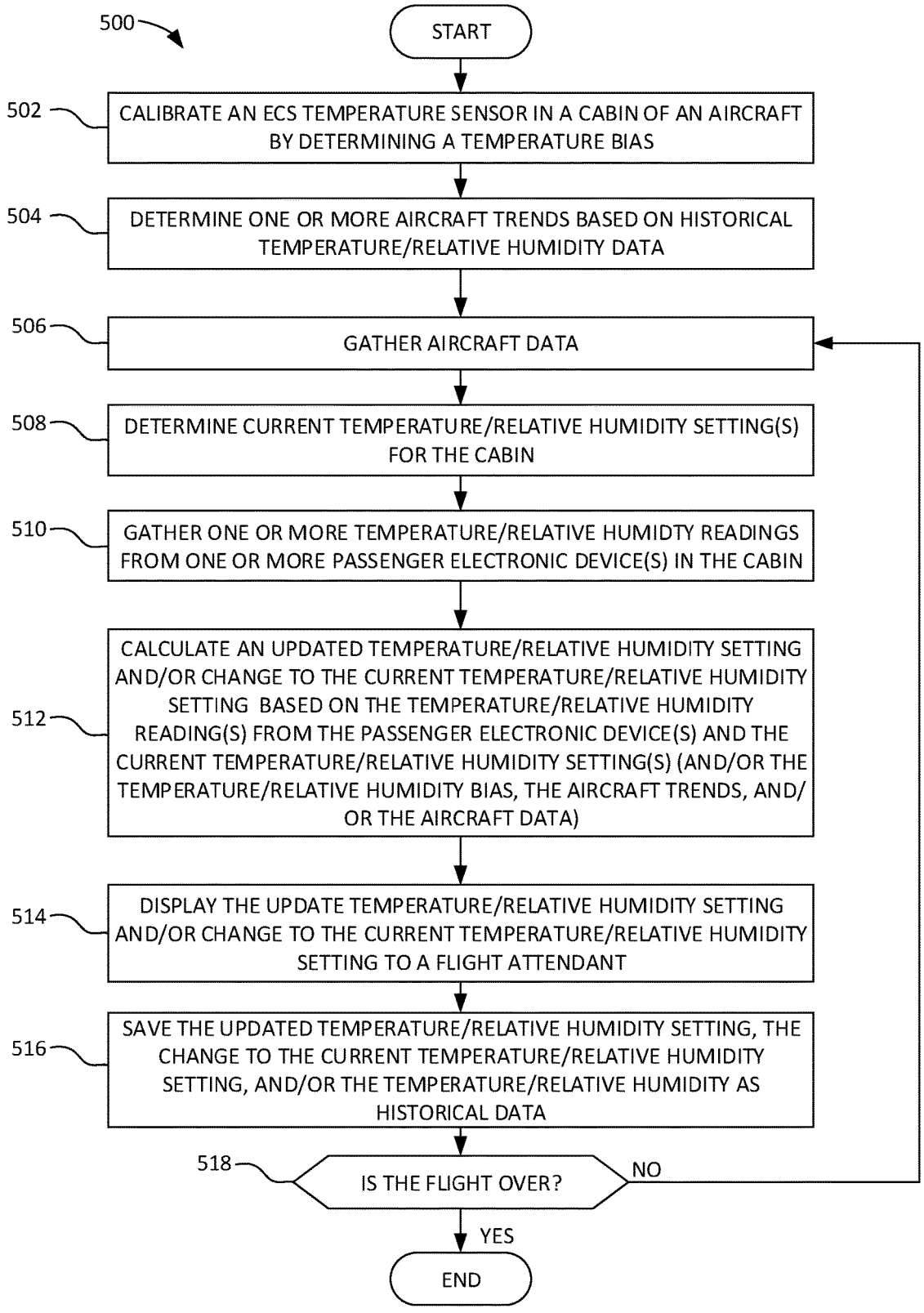
FIG. 5 is a flowchart representative of example machine readable instructions that may be executed to implement the example cabin air monitor of FIG. 3 to enhance control of temperature, relative humidity, and/or any other climate characteristic in the example cabin of FIG. 2.
Figure 6:
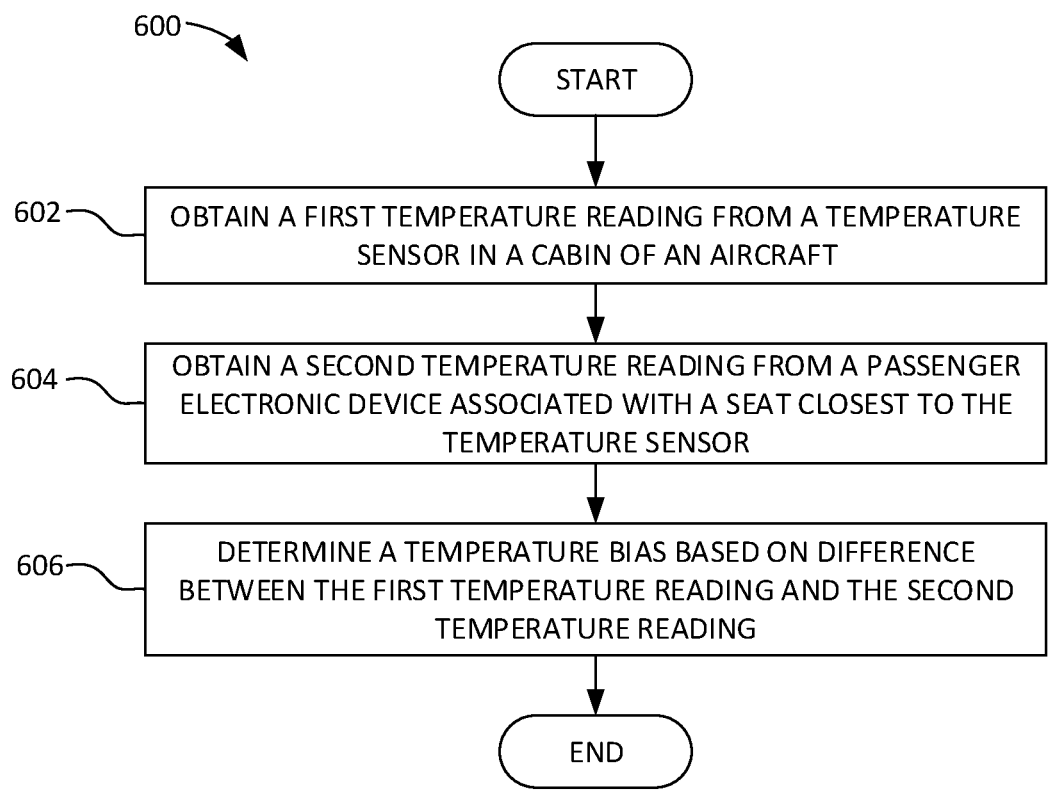
FIG. 6 is a flowchart representative of example machine readable instructions that may be executed to implement an example calibrator of the example cabin air monitor of FIG. 3 to calibrate a temperature sensor of the example ECS in the example cabin of FIG. 2.

Flowcharts representative of example machine readable instructions for implementing the cabin air monitor 302 of FIG. 3 are shown in FIGS. 5 and 6. In these examples, the machine readable instructions comprise programs for execution by a processor such as the processor 712 shown in the example processor platform 700 discussed below in connection with FIG. 7. The programs may be embodied in software stored on a non-transitory computer readable storage medium such as a CD-ROM, a floppy disk, a hard drive, a digital versatile disk (DVD), a Blu-ray disk, or a memory associated with the processor 712, but the entire programs and/or parts thereof could alternatively be executed by a device other than the processor 712 and/or embodied in firmware or dedicated hardware. Further, although the example programs are described with reference to the flowcharts illustrated in FIGS. 5 and 6, many other methods of implementing the example cabin air monitor 302 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 5 is a flowchart 500 representative of example machine readable instructions that may be executed by the flight attendant electronic device 304 to implement the example cabin air monitor 302 to enhance control of temperature, relative humidity, and/or any other climate characteristic in a cabin of an aircraft. The example flowchart 500 of FIG. 5 is described in connection with Zone A of the cabin 200 (FIG. 2). However, it is understood that the example flowchart 500 may be similarly implemented to monitor and/or regulate the temperature, relative humidity and/or any other climate characteristic in the other zones of the cabin 200 and/or the cabin 200 as a whole.

At block 502, the calibrator 336 calibrates the first temperature sensor 224 in Zone A of the cabin 200 by determining a temperature bias for the first temperature sensor 224. In some examples, there may be multiple temperature sensors in the same zone, and the calibrator 336 may similarly calibrate the other sensors in the zone. An example process of calibrating a temperature sensor is disclosed in connection with FIG. 6 and described in further detail below. Additionally or alternatively, if the ECS 202 is capable of controlling the humidity of the air in Zone A, the example process at block 502 may include calibrating an ECS humidity sensor. The humidity sensor calibration may be similar to the temperature sensor calibration process disclosed in further connection with FIG. 6.

At block 504, the aircraft trend manager 338 determines one or more aircraft trends (e.g., temperature and/or humidity patterns) based on historical temperature data and/or humidity data, which may be stored in the database 346. The aircraft trends may identify, for example, certain warmer or colder pockets that are often experienced in Zone A, how certain weather affects the air temperature and/or relative humidity in Zone A, how certain flight paths affect the air temperature and/or relative humidity in Zone A, etc. In some examples, the temperature setting calculator 328 and/or the humidity setting calculator 342 use the aircraft trends to establish a base or starting temperature setting and/or relative humidity setting for Zone A while the aircraft is loading passengers before flight. At block 506 of FIG. 5, the aircraft data manager 340 gathers current data about the aircraft 100, such as the current phase of flight the aircraft 100, the current temperature reading from the first temperature sensor 224 (and/or the other temperature sensors 226-236), the external temperature outside of the aircraft 100, etc.

At block 508, the current temperature manager 332 determines the current temperature setting (and/or desired temperature setting) for Zone A and/or the current humidity manager 344 determines the current relative humidity setting (and/or desired relative humidity setting) for Zone A. In some examples, the current temperature setting and/or relative humidity setting are manually entered into the flight attendant electronic device 304 by the flight attendant 306. For example, after setting the temperature and/or relative humidity in the temperature control panel 222 of the ECS 202, the flight attendant 306 may enter the temperature and/or relative humidity settings into the cabin air monitor 302 on the flight attendant electronic device 304. In other examples, the current temperature manager 332 and/or the current humidity manager 344 may determine the current temperature setting and/or relative humidity setting automatically. For example, the ECS controller 220 may transmit (e.g., via a broadcast signal) the temperature setting and/or relative humidity setting for Zone A to the flight attendant electronic device 304. In some examples, the temperature setting and/or relative humidity setting are communicated over the IFE system network 322. In other examples, the ECS controller 220 may transmit the temperature setting and/or relative humidity setting directly to the flight attendant electronic device 304 (e.g., via a Bluetooth® connection).

At block 510, the passenger data manager 330 gathers or accesses the one or more temperature readings and/or relative humidity readings from the one or more passenger mobile electronic device(s) in Zone A of the cabin 200. In some examples, the temperature readings and/or humidity readings are communicated to the passenger data manager 330 over the IFE system network 322. In some examples, the passenger data manager 330 generates a temperature profile or distribution that associates the temperature readings and/or humidity readings with specific location(s) (e.g., seats) in the cabin 200. In some examples, the location of the passengers' mobile electronic devices are transmitted with the temperature and/or humidity readings. Additionally or alternatively, the passenger data manager 330 may correlate the temperature and/or humidity readings with specific seats based on the identification of the specific passenger (e.g., using an assigned seating map for the flight).

In some examples, prior to accessing the temperature reading(s) and/or humidity reading(s) from the passenger electronic devices 310-314, the passenger data manager 330 may request authorization to access the temperature and/or humidity reading(s) from the passenger electronic devices 310-314. For example, the passenger data manager 330 may transmit an authorization message to be displayed on the passenger electronic devices 310-314. In some examples, the authorization message is provided through the airline specific program or application. The authorization message may ask the passenger if he/she would like to opt into the data sharing program to enhance the cabin air control.

At block 512, the temperature setting calculator 328 determines or calculates a new or updated temperature setting and/or change to the current temperature setting for Zone A based on the current temperature setting (determined at block 508) and the one or more temperature readings from the passenger electronic devices (gathered at block 510). The updated temperature setting may be, for example, a different temperature from the current temperature setting. For example, if the original temperature setting is at 72° F. (22.2° C.) (which is the desired temperature for Zone A), the temperature setting calculator 328 may determine the temperature should be set to 70° F. (21.1° C.) to result in a more consistent or average temperature of 72° F. (22.2° C.) across Zone A. In some examples, in addition to the current temperature setting and the one or more temperature readings from the passenger electronic device(s) 310-214, the temperature setting calculator 328 may calculate the updated temperature setting and/or change to the current temperature setting for Zone A based on the temperature bias (determined at block 502), the aircraft trend(s) (determined at block 504), and/or the aircraft data (gathered at block 506).

In addition to or as an alternative to determining the updated temperature setting and/or change to the current temperature setting, at block 512, the humidity setting calculator 342 may likewise determine or calculate a new or updated relative humidity setting and/or change to the current relative humidity setting for Zone A based on the current relative humidity setting and the relative humidity readings from the passenger electronic device(s). Further, in some examples, the humidity setting calculator 342 also uses a humidity bias (determined at block 502), the aircraft trend(s) (determined at block 504), and/or the aircraft data (gathered at block 506) to determine the updated relative humidity setting and/or change to the current relative humidity setting.

At block 514, the temperature setting calculator 328 causes the display screen 308 of the flight attendant electronic device 304 to display the updated temperature setting and/or the change to the current temperature setting (which would result in a temperature across Zone A that more closely matches the desired temperature). Likewise, the humidity setting calculator 342 causes the display screen 308 to display the new relative humidity setting and/or the change to the current relative humidity setting (which would result in a relative humidity across Zone A that more closely matches the desired relative humidity). As such, the flight attendant 306 can enter the updated temperature and/or relative humidity settings into the temperature control panel 222 of the ECS 202.

At block 516 of FIG. 5, the temperature setting calculator 328 saves the updated temperature setting, the change to the current temperature setting, and/or the temperature data used to determine the temperature setting and/or change (determined at blocks 502-510) in the database 346, which can then be used to determine aircraft trends during the same flight or for future flights with the aircraft 100. Likewise, the humidity setting calculator 342 saves the updated relative humidity setting, the change to the current relative humidity setting, and/or the humidity data used to determine the relative humidity setting and/or change (determined at blocks 502-510) in the database 346, which may also be used to determine aircraft trends during the same flight or for future flights with the aircraft 100.

While in the illustrated example of FIG. 3, the cabin air monitor 302 is implemented in the flight attendant electronic device 304, in other examples the cabin air monitor 302 may be implemented in the ECS controller 220 and directly adjusts the temperature setting and/or relative humidity setting in the ECS 202 based on the results of block 512. In such an example, the example process of FIG. 5 may include actuating the first valve 216 to change the temperature of the air flow provided by the first duct 204 to Zone A, thereby affecting the desired change to the temperature in Zone A. In some examples, the aircraft 100 may include multiple duct outlets in Zone A. In some such examples, the example instructions of FIG. 5 may include actuating various valves to eject warmer or cooler air based on the temperatures in the different sections of the zone. For example, referring back to FIG. 4, the right side of the cabin 200 is warmer than the left side of the cabin 200. In this instance, relatively cooler air may be provided to the right side of the cabin 200 (e.g., via a right side duct) to equalize the temperature across zone A and reduce (if not eliminate) pockets of cooler or warmer air. Similarly, the ECS 202 may automatically control the relative humidity of the air provided to Zone A based on the result of block 512.

At block 518, the aircraft data manager 340 determines whether the flight is over (e.g., based on input from the flight attendant 306, based on information from the IFE system network 322, etc.). If the flight is not over, control returns to block 506 and the example process of FIG. 5 repeats. If the flight is over, the example process of FIG. 5 ends. In some examples, the flight is considered over after all the passengers have exited the aircraft 100. Therefore, the example cabin air monitor 302 may continue to regulate the air temperature and/or relative humidity even when the aircraft 100 is on the ground and taxiing, unloading, etc. In other examples, the flight may be considered over once the aircraft 100 has landed on the runway. In some examples, if the flight attendant 306 desires to increase or decrease the temperature and/or humidity levels, the flight attendant 306 may enter the desired temperature and/or humidity level into the cabin air monitor 302, which then calculates a new or updated temperature setting and/or relative humidity setting that would result in the desire temperature and/or humidity level. The example process may be repeated periodically, such as every five minutes. The example process may also be performed for each of the other zones, simultaneously or in sequence. In addition to or as an alternative to temperature and relative humidity, the example process of FIG. 5 may likewise be used to enhance control of other climate characteristics, such as air flow, heat index, and/or air quality.

FIG. 6 is a flowchart 600 representative of example machine readable instructions that may be executed by the flight attendant electronic device 304 to implement the example calibrator 336 of the example cabin air monitor 302. The example process of FIG. 6 is described in connection with the first temperature sensor 224 in Zone A of the cabin 200. However, it is understood that the example process of FIG. 5 may be similarly used to calibrate other ones of the temperature sensors, humidity sensors and/or any other climate characteristic sensors in the cabin 200.

At block 602, the calibrator 336 obtains a first temperature reading from the first temperature sensor 224 in Zone A of the cabin 200. In some examples, the ECS controller 220 transmits the first temperature reading over the IFE system network 322 to the cabin air monitor 302 on flight attendant electronic device 304. In other examples, the ECS controller 220 may transmit the first temperature reading directly to the flight attendant electronic device 304 (e.g., via a Bluetooth® connection). In still other examples, the flight attendant may manually enter the first temperature reading into the cabin air monitor 302 on the flight attendant electronic device 304. For example, the flight attendant may read the temperature reading from the temperature control panel 222 and enter the temperature reading into the flight attendant electronic device 304.

At block 604, the calibrator 336 obtains a second temperature reading from a passenger electronic device associated with a seat that is closest to the first temperature sensor 224. In some examples, a seating map is stored in the database 346 that indicates which seat(s) are closest to the first temperature sensor 224. In some examples, only a temperature reading from the closest seat next to the first temperature sensor 224 is used. For example, referring briefly to FIG. 4, a temperature reading from seat 30A would be used. In other examples, if a temperature reading is not available from the closest seat, a temperature reading from another set within a threshold distance (e.g., a two seat radius) from the first temperature sensor 224 may be used.

At block 606 of FIG. 6, the calibrator 336 determines a temperature bias based on a difference between the first temperature reading and the second temperature reading. In some examples, an average of the respective readings are taken over a period of time (e.g., five minutes), and the difference of the averages is used as the temperature bias. The temperature bias may be saved in the database 346 and/or used by the temperature setting calculator 328 when calculating the updated temperature setting and/or change to the current temperature setting.

Figure 7:
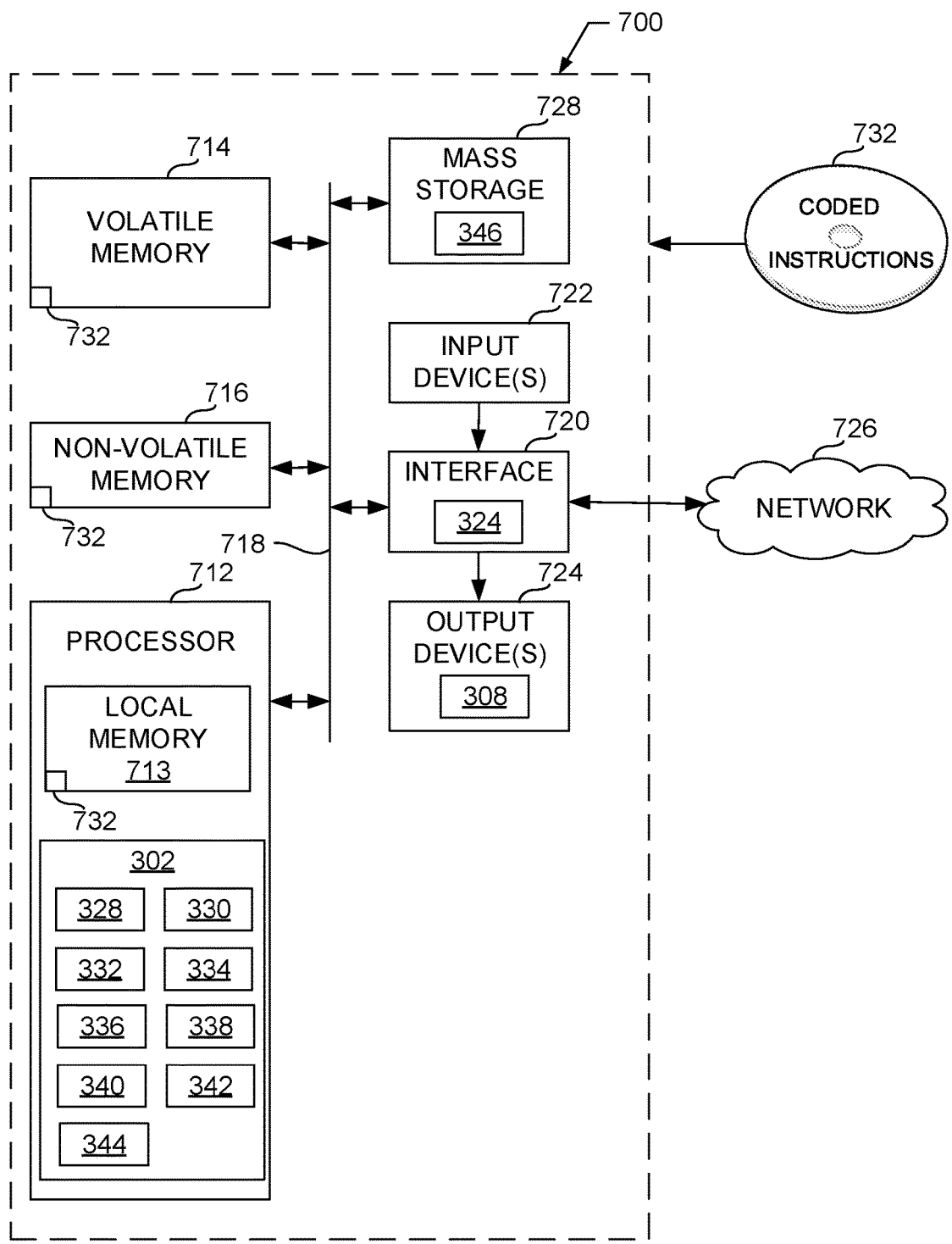
FIG. 7 is a processor platform that may execute the example instructions of FIGS. 5 and 6 to implement the example cabin air monitor of FIG. 3.

FIG. 7 is a block diagram of an example processor platform 700 capable of executing the instructions of FIGS. 5 and 6 to implement the cabin air monitor 302 of FIG. 3. The processor platform 700 can be, for example, a mobile device such as a cell phone, a smart phone, a tablet (e.g., the flight attendant electronic device 304), etc., an ECS controller (e.g., the ECS controller 220), a server, personal computer, a personal digital assistant (PDA), an Internet appliance, a DVD player, a CD player, a Blu-ray player, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. The hardware processor may be a semiconductor based (e.g., silicon based) device. In this example, the processor 712 may implement the example temperature setting calculator 328, the example passenger data manager 330, the example current temperature manager 332, the example filter 334, the example calibrator 336, the example aircraft trend manager 338, the example aircraft data manager 340, the example humidity setting calculator 342, the example current humidity manager 344, and/or, more generally, the example cabin air monitor 302.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen (e.g., the display screen 308 may be a touchscreen), a track-pad, a trackball, isopoint and/or a voice recognition system.

One or more output devices 724 are also connected to the interface circuit 720 of the illustrated example. The output device(s) 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip and/or a graphics driver processor. In this example, the output device(s) 724 may include the display screen 308. Additionally or alternatively, if the cabin air monitor 302 is implemented in the ECS 202, the output device(s) 724 may include one or more of the valves (e.g., the first valve 216) used to control air flow through the ducts 204-214.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., the IFE system network 322, an Ethernet connection, a digital subscriber line (DSL), a telephone line, coaxial cable, a cellular telephone system, etc.). In this example, the interface 702 may implement the transceiver 324, for example.

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. The mass storage 728 may implement the database 346, for example.

Coded instructions 732 of FIGS. 5 and 6 may be stored in the mass storage device 728, in the volatile memory 714, in the non-volatile memory 716, and/or on a removable tangible computer readable storage medium such as a CD or DVD.

From the foregoing, it will be appreciated that example methods, apparatus, systems, and articles of manufacture have been disclosed that utilize temperature and/or humidity readings from mobile electronic devices in a cabin of an aircraft to enhance control of the cabin air temperature and/or relative humidity. Some examples disclosed herein may be implemented with little or no modification to the existing aircraft. As such, examples disclosed herein can be easily adapted for use in any existing or future aircraft.

Although certain example methods, apparatus, systems, and articles of manufacture have been disclosed herein, the scope of coverage of this patent is not limited thereto. On the contrary, this patent covers all methods, apparatus, systems and articles of manufacture fairly falling within the scope of the claims of this patent.

What is claimed is:

1. A personal portable electronic device comprising:
   a transceiver to receive a plurality of climate characteristic values measured by a plurality of personal mobile electronic devices in a cabin of an aircraft; and
   a cabin air manager to calculate a change to a climate characteristic setting for an environmental control system (ECS) of the aircraft based on a desired climate characteristic setting in the cabin and a median of the plurality of climate characteristic value values.

2. The personal portable electronic device of claim 1, wherein the climate characteristic values are temperature readings, the desired climate characteristic setting is a desired temperature setting in the cabin, and the change to the climate characteristic setting is a temperature change.

3. The personal portable electronic device of claim 1, wherein the climate characteristic values are humidity readings, the desired climate characteristic setting is a desired relative humidity setting in the cabin, and the change to the climate characteristic setting is a relative humidity change.

4. The personal portable electronic device of claim 1, wherein the transceiver is to receive the climate characteristic values, the desired climate characteristic setting, or both the climate characteristic values and the desired climate characteristic setting via an in-flight entertainment (IFE) system network in the aircraft.

5. The personal portable electronic device of claim 1, further including a display screen, the cabin air manager to display the change to the climate characteristic setting on the display screen.

6. A method to enhance air temperature control in a cabin of an aircraft, the method comprising:
   accessing, by executing an instruction with a processor, a temperature reading from a personal mobile electronic device in the cabin of the aircraft;
   calculating, by executing an instruction with the processor, an updated temperature setting for an environmental control system (ECS) of the aircraft based on a current temperature setting of the ECS and the temperature reading; and
   prior to calculating the updated temperature setting, calibrating, by executing an instruction with the processor, a temperature sensor of the ECS in the cabin of the aircraft to determine a temperature bias.

7. The method of claim 6, wherein the personal mobile electronic device is a first personal mobile electronic device, further including displaying, by executing an instruction with the processor, the updated temperature setting on a display screen of a second personal mobile electronic device controlled by a flight attendant.

8. The method of claim 7, wherein the second personal mobile electronic device is at least one of a tablet, a laptop computer, or a cell phone.

9. The method of claim 6, wherein the calculating of the updated temperature setting is based on one or more aircraft trends relating to temperature patterns in the cabin.

10. The method of claim 6, wherein the calculating of the updated temperature setting is based on aircraft data including at least one of a phase of flight of the aircraft, a cabin temperature as detected by a temperature sensor of the ECS in the cabin, or an external temperature of the aircraft.

11. The method of claim 6, wherein the temperature bias is based on a first temperature reading from the temperature sensor and a second temperature reading from a personal mobile electronic device associated with a seat of a passenger in the cabin closest to the temperature sensor.

12. The method of claim 6, wherein the calculating of the updated temperature setting is based on the temperature bias.

13. The method of claim 6, further including:
   accessing, by executing an instruction with the processor, a humidity reading from the personal mobile electronic device; and
   calculating, by executing an instruction with the processor, an updated relative humidity setting for the ECS based on a current relative humidity setting of the ECS and the humidity reading.

14. The method of claim 6, wherein the temperature reading is a first temperature reading, the personal mobile electronic device is a first personal mobile electronic device associated with a first passenger in a first zone of a plurality of zones in the cabin, the current temperature setting is a first current temperature setting for the first zone, and the updated temperature setting is a first updated temperature setting for the first zone, further including:
   accessing, by executing an instruction with the processor, a second temperature reading from a second personal mobile electronic device associated with a second passenger in a second zone of the cabin; and
   calculating, by executing an instruction with the processor, a second updated temperature setting for the second zone based on a second current temperature setting for the second zone and the second temperature reading.

15. A non-transitory machine readable storage medium comprising instructions that, when executed, cause a machine to at least:
   access a plurality of temperature readings from a plurality of personal mobile electronic devices in a cabin of an aircraft; and
   calculate a change to a temperature setting for an environmental control system (ECS) of the aircraft based on a desired temperature in the cabin and a median of the plurality of temperature readings.

16. The non-transitory machine readable storage medium of claim 15, wherein the desired temperature is a current temperature setting of the ECS.

17. The non-transitory machine readable storage medium of claim 15, wherein the plurality of personal mobile electronic devices include at least one of a tablet, a laptop computer, a cell phone, or a wearable device.

18. The non-transitory machine readable storage medium of claim 15, wherein the instructions, when executed, further cause the machine to actuate a valve in the ECS to affect a temperature of air flow provided to the cabin based on the change to the temperature setting.

19. The personal portable electronic device of claim 1, wherein the cabin air manager is to receive the desired climate characteristic setting via user input.

20. The personal portable electronic device of claim 1, wherein the transceiver is to receive seat information from the plurality of personal mobile electronic devices associated with the plurality of climate characteristic values.

* * * * *

UNITED STATES PATENT AND TRADEMARK OFFICE
CERTIFICATE OF CORRECTION

PATENT NO. : 10,513,339 B2
APPLICATION NO. : 15/691204
DATED : December 24, 2019
INVENTOR(S) : Eric Lee Nicks Page 1 of 1

It is certified that error appears in the above-identified patent and that said Letters Patent is hereby corrected as shown below:

In the Claims

Column 23, Line 35 (Claim 1):
Delete the word "value"

Signed and Sealed this
Fourteenth Day of April, 2020

Andrei Iancu
*Director of the United States Patent and Trademark Office*